Oct. 24, 1967   HENRI-PIERRE CHABRIER ET AL   3,348,772
ALARM SYSTEM
Filed Jan. 2, 1964                                    2 Sheets-Sheet 1

INVENTORS
HENRI-PIERRE CHABRIER
ANDRE SAINT-JOANIS
BY Paul M. Craig, Jr.
ATTORNEY

INVENTORS
HENRI-PIERRE CHABRIER
ANDRE SAINT-JOANIS
BY
ATTORNEY

United States Patent Office 3,348,772
Patented Oct. 24, 1967

3,348,772
ALARM SYSTEM
Henri-Pierre Chabrier, 39 Rue Boileau, Lyon 6e, France, and Andre Saint-Joanis, 47 Ave. Vallioud, Sainte-Foy-les-Lyon, France
Filed Jan. 2, 1964, Ser. No. 335,265
Claims priority, application France, Jan. 5, 1963, 920,557
20 Claims. (Cl. 235—201)

The present invention relates to a fluid operated alarm or warning sequence with two alarm or warning devices of which one is either at rest or in continuous operation and of which the other is either at rest, in rhythmic operation or in continuous operation.

The alarm or warning sequence according to the present invention comprises, in combination:

An input receiver or interceptor unit for the fault of failure signal;

Two warning devices or alarm units and the control and actuating systems thereof actuated by the signal issued from the input receiver or interceptor unit, the actuating and control system of the second warning device including an oscillator, A memory unit with manual control, actuated by the signal issued from the input receiver or interceptor unit, and which the output is connected to the control and actuating systems of the warning devices or alarm units, And, if so desired, a manual fugitive control device for the operation of the second warning or alarm unit.

Accordingly, it is an object of the present invention to provide a warning or alarm unit which is extremely simple in construction, yet reliable in operation to provide the desired supervisory functions.

Another object of the present invention resides in the provision of a fluid operated warning system with two warning devices which utilize fluid distributor structures to enable operation of the warning devices in the rest condition, in continuous operation or possibly also in rhythmic operation.

Still another object of the present invention resides in the provision of a warning system utilizing two warning units which are completely fluid-operated by the use exclusively of pneumatic and/or hydraulic pressure media.

Still a further object of the present invention resides in the provision of a warning system utilizing fluid distributor devices which offers versatility in its applications together with simple controls as well as accurate indications of existing operating conditions.

These and other objects, features and advantages of the present invention will become more obvious from the following description when taken in connection with the accompanying drawing which shows, for purposes of illustration only, several embodiments in accordance with the present invention, and wherein FIGURES 1 and 2 are two schematic diagrams illustrating the principle of two embodiments of alarm or warning sequencies according to the present invention;

Figure 3:
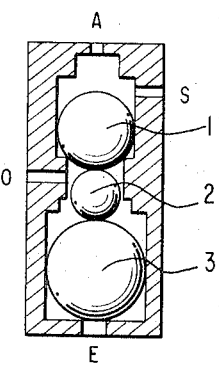
FIGURES 3 and 4 are two longitudinal axial cross sectional views through two fluid switching structures or fluid operated flip-flop devices formed by balance valves having two stable positions and adapted to be used for the practical realization of the alarm or warning sequences of the present invention.
Figure 9:
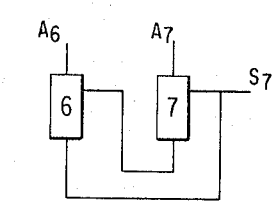
Figures 5, 6, 7, 8:
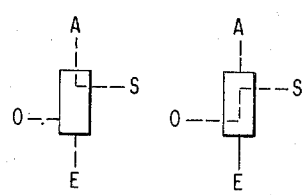
FIGURES 5, 6, 7 and 8 are schematic diagrams illustrating the logical operation of the switching or flip-flop devices formed by the balance valves of FIGURES 3 and/or 4.
Figure 10:
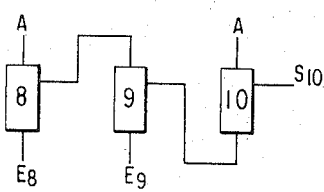
Figure 11:
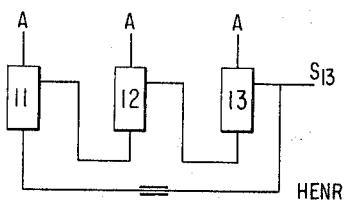
Figure 12:
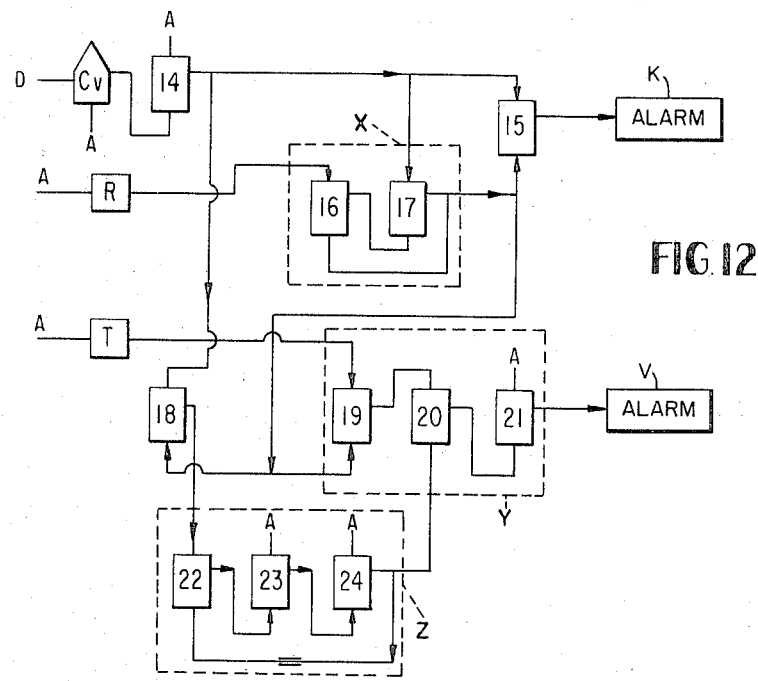
Figure 13:
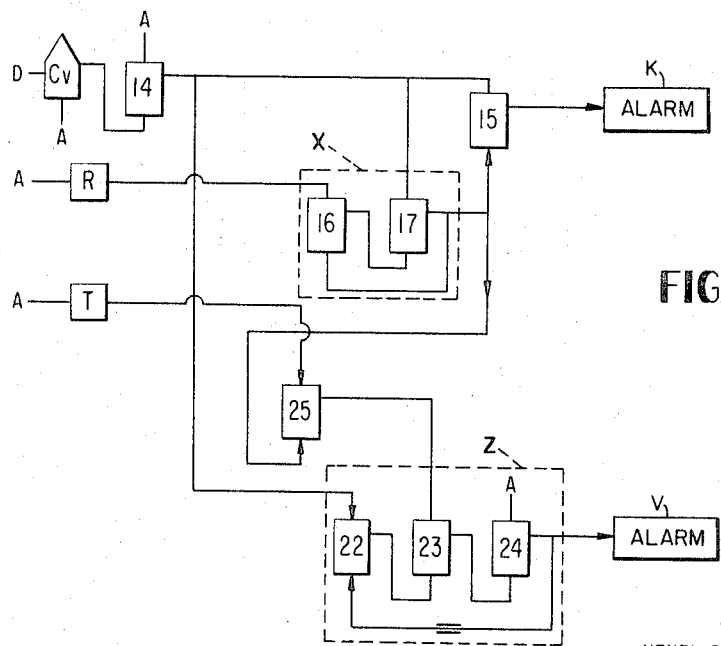

FIGURES 9, 10 and 11 are schematic diagrams illustrating three simple circuits utilizing bi-stable fluid distributor or flip-flop devices formed by the balance valves of FIGURES 3 and/or 4, and FIGURES 12 and 13 are two schematic diagrams of two embodiments of alarm or warning sequences according to the present invention realized by the use of bi-stable switching or flip-flop devices formed by the balance valves of FIGURES 3 and/or 4.

The general conditions imposed by the present invention are the following:

The presence of a fault or failure in the system which is to be watched causes an actuating or triggering pressure to be injected into the warning circuit and should trigger the operation of a continuous warning signal and of a second oscillating warning signal; the recording of the presence of the fault or failure should cancel the first signal and convert the second signal into a continuous signal; and finally, the disappearance of the fault or failure should cause the warning signals to be stopped altogether.

Figure 4:
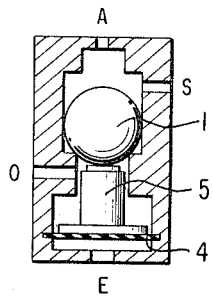

In the following detailed description of the invention, the systems and subsystems described and illustrated are formed by specific interconnection of switching devices such as illustrated in FIGURES 3 and 4 and referred to in the text as "distributing devices." In order to simply the drawings, the distributing devices are illustrated in detail only in FIGURES 3 and 4, with a rectangular symbol showing the input and output lines connected thereto used in connection with the systems and subsystems in the remaining views.

Figure 1:
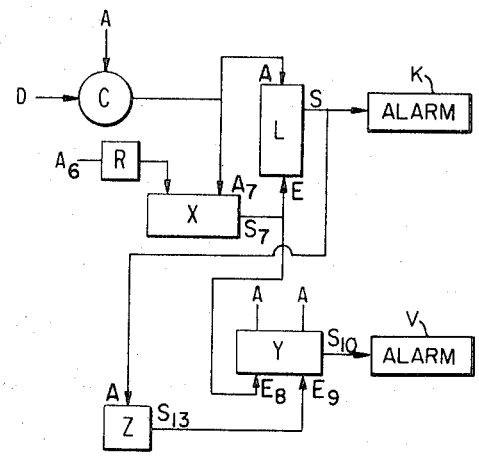
Figure 2:
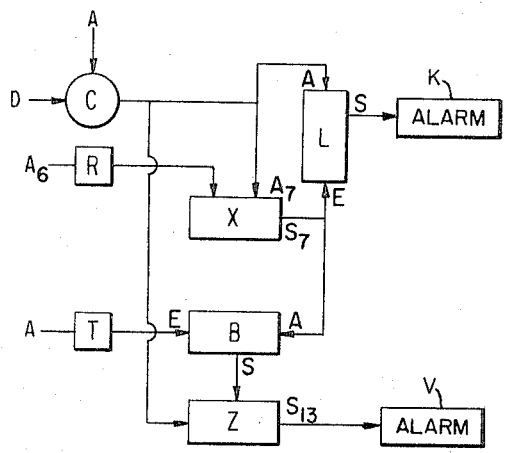

Referring now to the drawing wherein like reference characters and reference numerals are used throughout the various views to designate like parts, and more particularly to FIGURES 1 and 2, schematically illustrating two fluid operated circuits of alarm or warning sequences according to the present invention, the arrows indicate in both of these schematic diagrams the direction of action of the controls. In these two figures, reference character A always designates the permanent fluid feed or supply with the requisite energy necessary for the proper operation of the sequence.

In FIGURE 1, the fault or failure signal D in the form of a pressure variation in the conduit connecting the system to be supervised with the alarm circuit is transmitted by the input receiver or interceptor unit C to the warning or alarm sequence system of the present invention in the form of a binary signal having states 0–1. The receiver or interceptor unit C is connected directly to the control system L, which takes the form of a distributor device such as illustrated in FIGURES 3 or 4, for actuating the warning device or alarm unit K. The oscillator portion Z of the control system Y, Z for actuating the warning device or alarm unit V is actuated by the output signal of the control system L and may take the form of the combination illustrated in FIGURE 11. The signal issued from the receiver or interceptor unit C is, on the other hand, transmitted to the memory unit X, illustrated in detail in FIGURE 9 which itself is manually controlled by means of the manually operated interrupter control member R, which may take the form of a conventional value. The output of the memory unit X is connected to the distributor device L and to the portion Y of the actuating control system Y, Z of the warning device or alarm unit V; the output of the oscillator Z also actuates the portion Y of the control system Y, Z of the warning device or alarm unit V which portion Y produces a logical "OR" function with its two inputs.

In the absence of a fault, the receiver or interceptor unit C transmits the zero signal into the sequence system at rest. At the appearance of a fault or failure signal D, the receiver or interceptor unit C transmits the signal 1 which energizes the distributor device L and sets into operation the warning device K; the oscillator Z is also set into operation and produces, by way of the portion Y of the control system Y, Z for the warning device V, the rhythmic operation of the warning device or alarm unit V. The signal 1 is additionally received and stored by the memory unit X which does not yet supply any signal. Upon the indication of the warning devices K and V thus set into operation by the failure or fault signal D, one records manually the presence of the fault by actuating the member R which causes the interrupter memory unit X to switch or flip-flop. The memory unit X transmits the signal 1, on the one hand, to the distributor device L thereby stopping the warning device or alarm unit K and the oscillator Z, and on the other hand, to the portion Y of the control system Y, Z which sets the warning device or alarm unit V into continuous operation. At the disappearance of the fault signal D, the memory unit X supplies the signal 0 which stops the warning device or alarm unit V. The alarm sequence system is thus returned to the initial conditions.

In the schematic diagram of FIGURE 2, the oscillator Z, controlling directly the warning device or alarm unit V, is itself actuated either by the signal transmitted by the receiver or interceptor unit C or by the signal issued by the memory unit X which may thus, by way of the system B block the output of the oscillator Z in the state or condition 1 and thus actuate the warning device or alarm unit V in a continuous manner. The system B may also be actuated by a signal issued from a manual apparatus T in such a manner as to control at any moment the operation of the warning device or alarm unit V. The operation will be described more fully hereinafter in connection with the detailed description of actual embodiments according to the present invention, as illustrated in FIGURES 12 and 13.

The alarm or warning sequence which operates under the action of a binary signal having states 0-1 may be represented with the aid of logical function. Preferred realizations have been obtained with the aid of fluid distributor devices having two stable positions of the balance valve types illustrated in FIGURES 3 and 4 which are, on the one hand, adapted to form logical circuits and, on the other, are capable to operate as oscillators. These fluid distributor devices comprise a so-called feed or supply input A, a so-called control input E, an orifice O connected to the reference pressure, and an output S, susceptible to be switched or commutated to be connected either with the feed input A or with the reference pressure O, by the displacement of the ball 1 under the action of the resultant of the pressure force at the feed input A and of the pressure force at the control input E, transmitted by the balls 2 and 3 in the embodiment of FIGURE 3 or by the diaphragm 4 and the plunger piston 5 in the embodiment of FIGURE 4. The distributor devices of FIGURES 3 and 4 realize between the signals $a$ and $\bar{e}$ at the inputs thereof and the output signal $s$ the logical function, designated in Boolean notation as:

$$s = a \times \bar{e}$$

The four pressure conditions at the orifices of these fluid distributor devices are schematically illustrated in the four FIGURES 5 to 8 in which the full lines represent the conduits under pressure corresponding to the binary condition or designation 1 and the dash line, the conduits at the reference pressure corresponding to the binary condition or designation 0.

In FIGURES 9, 10 and 11, which illustrate various combinations of the fluid distributor devices or FIGURES 3 and/or 4, the continuous feeds or supplies are indicated by the letter A.

FIGURE 9 schematically illustrates an assembly or circuit of two distributor devices 6 and 7 into a memory unit, which may serve as the unit X in the switching systems of FIGURES 1 and 2, of which the switching or flip-flop is obtained by brief alternating interruptions in the two feeds $A_6$ and $A_7$.

FIGURE 10 schematically illustrates a circuit with three distributor devices 8, 9 and 10, which may serve as the unit Y in the systems of FIGURES 1 and 2, operable to perform the logical "OR" function and having two inputs $E_8$ and $E_9$.

FIGURE 11 schematically illustrates an assembly or circuit of three distributor devices 11, 12 and 13 forming an oscillator, which may serve as the unit Z in the systems of FIGURES 1 and 2. A rhythmic signal 0-1 is furnished by the output $S_{13}$.

The circuits of FIGURES 9, 10 and 11 can be recognized again in connection with the alarm or warning sequence system of FIGURES 12 and 13 of the present invention.

FIGURE 12 illustrates a detailed schematic diagram of an alarm sequence according to the present invention. Reference character A represents a permanent feed or supply with a constant pressure. The fault signal or failure D occurs as a pressure drop at the input of the receiver or interceptor unit—corresponding to unit C of FIGURE 1—formed by a switching or flip-flop device $C_v$ with variable threshold, such as disclosed in co-pending application, Ser. No. 332,364, filed Dec. 23, 1963, and a distributor device 14. The output of the distributor device 14 is connected to the feed of the actuating control distributor device 15 for the warning device or alarm unit K of any known, conventional construction and therefore not shown in detail, to the feed of the distributor device 17 of the memory unit X and to the feed of the distributor device 18 which controls the operation of the oscillator Z consisting of distributor devices 22-23-24. The distributor device 16 of the memory unit X is supplied or fed permanently by way of the constant pressure feed A, except in case of brief manual actuation of the interruptor device R consisting of a fluid valve of conventional construction. The output of the memory unit X is connected to the input of the actuating control distributor device 15, to the control input of the fluid distributor device 18 and to the control input of the first distributor device 19 of the logical "OR" function unit Y consisting of distributor devices 19-20-21, the output of which controls the warning device or alarm unit V also of conventional construction. The distributor device 19 of the logical "OR" function unit 19-20-21 is fed or supplied permanently by way of the constant pressure feed A, except for brief manual actuation of the interruptor T consisting of a fluid valve of conventional construction for the control of the operation of the warning device or alarm unit V. The output of the oscillator Z is connected to the second control input of the "OR" function unit Y at the distributor device 20.

The appearance of a fault signal D produces the output of signal 1 in the distributor device 14, hence causes the continuous operation of the warning device K via distributor 15 and the feed or energization of the oscillator Z via distributor 18, and therewith the rhythmic operation of the warning device V via OR function unit Y. The detection or recording of the fault by a brief manual actuation on the interruptor R produces the switching or flip-flop of the memory unit X which supplies the signal 1 to control inputs of fluid distributor devices 15, 18 and 19 which brings about, respectively, the stoppage of the warning device K and of the oscillator Z, and the continuous operation of the warning device V. The disappearance of the fault signal D returns the warning device V to the rest condition thereof and the sequence to its initial state. A brief actuation on the interruptor T in the absence of a fault produces the brief corresponding operation of the warning device V.

FIGURE 13 represents the detailed schematic diagram of a modified realization in accordance with the present invention. Reference character A represents still a permanent feed or supply with constant pressure. The difference of the diagram of FIGURE 13 from the schematic diagram of FIGURE 12 resides in the elimination of the "OR" function unit of FIGURE 12 and the use of three states or conditions of the oscillator Z, namely, binary states 0, 1, and oscillation. The oscillator Z is fed directly by the output of the fluid distributor device 14. The output of the memory unit X is connected to the fluid distributor device 15 and to the distributor device 25, the output of which is connected to the feed or supply of the second element 23 of the oscillator Z, the output of which, in turn, directly controls the warning device V.

The appearance of a fault produces the output of the signal 1 from the fluid distributor device 14 which sets into operation the warning device K via distributor device 15 and the oscillator Z directly which controls the rhythmic operation of the warning device V. The detection or recordation of the fault by brief manual actuation of the interruptor R produces a switching or flip-flop of the memory unit X, hence the stoppage of the warning device K and the stoppage of the feed of the second fluid distributor device 23 in the oscillator Z. The last element 24 of the oscillator Z therefore delivers the continuous signal 1 and the warning device V is in continuous operation. The disappearance of the fault stops the warning device V and brings back the sequence to its initial state. In the absence of a fault, a brief actuation on the interruptor T cuts the feed or supply of the fluid distributor device 23 and sets into corresponding brief operation the warning device V.

While we have shown and described several embodiments in accordance with the present invention, it is understood that the same is not limited thereto, but is susceptible of numerous changes and modifications as known to a person skilled in the art. For example, the various assemblies and circuits performing certain logical functions may be realized in various other ways as described more fully in our copending application, S.N. 276,565, filed on Apr. 29, 1963, now U.S. Patent No. 3,242,946, which also describes in greater detail the operation of some of the logical circuits used with the warning sequence of the present invention. Thus, it is obvious that the present invention may be modified in numerous ways without departing from the spirit and scope thereof, and we therefore do not wish to be limited to the details shown and described herein, but intend to cover all such changes and modifications as are encompassed by the scope of the appended claims.

We claim:
1. A fluid-operated alarm sequence, comprising: fault signal detector means, first warning means, second warning means, one of said warning means being capable of functioning in rhythmic operation, actuating control means operatively connected with both of said warning means for controlling and actuating said warning means including oscillator means for producing a rhythmic signal upon actuation thereof connected with one of said warning means, said rhythmic signal being applied to said one warning means for actuating said one warning means in the rhythmic operation thereof, memory means, connecting means operatively connecting said memory means with said detector means, said memory means being actuated by the output signal of said detector means supplied by said connecting means, and further means connecting said memory means with said oscillator means connected to said one warning means for actuation thereof, said memory means including manually operated means for switching said memory means to thereby produce an output signal applied to said oscillator means for transforming the rhythmic signal of said oscillator means applied to said one warning means into a continuous signal.

2. The combination defined in claim 1, wherein said detector means includes a switching device formed by a balance valve having a variable threshold and being operable at the reception of the fault signal to transmit a signal pressure into the alarm sequence.

3. The combination defined in claim 1 and further including additional manually operated means being connected with said oscillator means for acting directly, in the absence of a fault signal, on the oscillator means to actuate said one warning means in a continuous manner.

4. The combination defined in claim 1, wherein said actuating control means is formed of a combination of logical switching means each provided with two input means and an output means realizing the function $$s = a \times \bar{e}$$

between the signals at the input and output means thereof wherein $a$ is the first input signal, $\bar{e}$ symbolizes the lack of the second input signal, $\times$ designates the notation for the logical AND function, and $s$ is the output signal which is present only if the first input signal is present and the second input signal is not present.

5. A fluid-operated alarm sequence system operable in the binary code, comprising:
fault signal detector means including bi-stable fluid-operated switching means for producing a control signal,
first fluid-operated warning means,
second fluid-operated warning means,
one of said warning means being capable of functioning in rhythmic function,
fluid-operated oscillator means producing a rhythmic signal upon actuation thereof for control of said one warning means,
fluid-operated memory means producing no output signal upon actuation thereof by said control signal and selectively operable means connected with said memory means for changing its condition to produce an actuating signal output,
fluid-operated switching control means responsive to said actuating signal for supplying said one warning means with a continuous signal, and connecting means interconnecting said detector means with the other warning means, said memory means and said oscillator means and said switching control means with said one warning means and said memory means, whereby in the presence of a fault signal one of said warning means operates in rhythmic function and the other warning means operates continuously, that upon actuation of said selectively operable means in the presence of the fault signal said one warning means is stopped and said other warning means is changed-over to continuous operation, and that upon disappearance of the fault signal, said other warning means is also stopped.

6. A warning sequence system according to claim 5, wherein the fluid-operated means are operated by a hydraulic media.

7. A warning sequence system according to claim 5, wherein the fluid-operated means are operated by pneumatic media.

8. A warning sequence system according to claim 5, wherein said fluid-operated means include switching devices of the balance-valve type having a plurality of passageways forming valve seats, ports in communication with said passageways, and a plurality of movable valve members in operative connection with one another for selectively engaging with respective valve seats.

9. A warning sequence system according to claim 5, wherein said fluid-operated means include switching devices of the balance-valve type having a plurality of passageways forming valve seats, ports in communication with said passageways, at least one movable valve member in one of said passageways for selectively engaging with respective valve seats, a diaphragm accuated by the pressure prevailing in one of said ports, and piston means operatively connecting said valve member with said diaphragm.

10. A fluid-operated alarm sequence system, comprising:
fault detector means including a switching device having two bi-stable conditions for producing an actuating signal in response to detection of a fault,
two alarm means, one of said alarm means being at rest, in continuous operation or in rhythmic operation, and the other alarm means being either at rest or in continuous operation,
oscillator means formed by switching devices having two bi-stable conditions operatively connected with said one alarm means for selectively generating a first signal actuating said one alarm means in rhythmic function and a second signal actuating said one alarm means in continuous operation,
memory means formed by switching devices having two bi-stable conditions, one condition producing no signal and the other condition producing a control signal,
plural control means formed by switching devices having two bi-stable conditions, one of said control means connecting said fault detector means with said other alarm means to apply said actuating signal thereto to actuate said other alarm means in continuous operation,
manually operable means for switching said memory means to the condition producing said control signal in the presence of the fault,
and means including first connecting means connecting said detector means with said oscillator means via said one control means for application of said actuating signal thereto switching said oscillator means to the condition generating said first signal and second connecting means operatively connecting said memory means with said one control means and with said oscillator means to apply said control signal thereto changing the condition of said oscillator means and disabling said one control means to switch said oscillator means to the condition generating said second signal to produce a continuous warning signal in said one alarm means and extinguish the warning signal in the other alarm means upon actuation of said manually operable means, said memory means returning to its one condition in absence of said actuating signal to extinguish the continuous warning signal in said one alarm means upon disappearance of the fault.

11. The combination defined in claim 10 and further including additional manually operable means connected with the other of said control means for producing, in the absence of a fault, a continuous warning signal in said one alarm means upon actuation and substantially for the duration of the actuation of said additional manually operable means.

12. A fluid alarm sequence, comprising:
an input unit for receiving a fault signal and transmitting the same to the sequence in binary code including a bi-stable switching device having an output adapted to produce the binary signal,
a first alarm unit operable to produce a continuous signal in response to conditions operation in the presence of a fault signal,
first means connecting the output of said input unit to said first alarm unit including a first bi-stable switching device having a control input receiving said fault signal, a supply input, and an output connected to said first alarm unit,
a memory unit connected with said input unit and said first bi-stable switching device including two bi-stable switching devices each provided with a supply input, a control input and an output,
first interruptor means for temporarily interrupting the supply input of one of said two bi-stable switching devices,
a second alarm unit operable to produce a rhythmic signal in response to rythmic actuation in the presence of a fault signal and a continuous signal in response to continuous operation upon actuation of said first interruptor means in the presence of the fault signal.
an oscillator unit operable to produce a rhythmic output signal in binary code including three bi-stable switching devices each having a supply input, a control input and an output,
second means connecting the output of the input unit to the supply input of the first one of the three bi-stable switching devices of the oscillator unit for actuation thereof,
third means connecting the rhythmic output signal of said oscillator unit to the second alarm unit,
fourth means for supplying the input supply of the second switching device of the oscillator unit with predetermined fluid pressure during generation of said rhythmic output signal,
and fifth means operatively connecting the output of said memory unit to said fourth means for switching the condition of said oscillator means, whereby the continuous signal in the first alarm unit is extinguished and the rhythmic signal in the second alarm unit is changed over to a continuous signal upon actuation of the first interruptor means, and the continuous signal in the second warning unit is extinguished upon disappearance of the fault signal.

13. A fluid alarm sequence, comprising:
an input unit for receiving a fault signal and transmitting the same to the sequence in binary code including a bi-stable switching device having an output adapted to produce the binary signal, a control input, and a supply input fed permanently with predetermined fluid pressure,
a first alarm unit operable to produce a continuous signal in response to continuous actuation in the presence of a fault signal,
first means operatively connecting the output of said input unit to said first alarm unit including a first bi-stable switching device having a control input, a supply input connected to the output of the input unit and an output connected to the first alarm unit,
a memory unit operatively connected with said input unit and said first bi-stable switching device including two bi-stable switching devices each provided with a supply input, a control input and an output, the supply input of one of the two bi-stable switching devices being fed permanently with predetermined fluid pressure, the output of said one switching device being connected to the control input of the other one of the two bi-stable switching devices, the output of said other bi-stable switching device being connected to the control inputs of said first bi-stable switching device and of said one bi-stable switching device, and the supply input of said other bi-stable switching device being connected to the output of said input unit,
first interruptor means for temporarily interrupting the supply input of the one of said two bi-stable switching devices,
a second alarm unit operable to produce a rhythmic signal in response to rhythmic operation in the presence of a fault signal and a continuous signal in response to continuous operation upon actuation of said first interruptor means in the presence of the fault signal,
an oscillator unit operable to produce a rhythmic output signal in binary code including three bi-stable switching devices each having a supply input, a control input and an output, the output of the first one of the three bi-stable switching devices being connected to the control input of the next one of the three bi-stable switching devices whose output is connected to the control input of the last one of the three bi-stable switching devices while the output of the last one of the three bi-stable switching devices is connected to the control input of the first one of the three bi-stable switching devices and the supply input thereof is fed permanently with predetermined pressure fluid, second means operatively connecting the output of the input unit to the supply input of the first one of the three bi-stable switching devices of the oscillator unit, third means operatively connecting the output of the last one of the three bi-stable switching devices of said oscillator unit to the second alarm unit, fourth means for supplying the input supply of the second switching device of the oscillator unit with predetermined fluid pressure, and fifth means operatively connecting the output of the other switching device of said memory unit to said fourth means for switching the condition of said oscillator means, whereby the continuous signal in the first alarm unit is extinguished and the rhythmic signal in the second alarm unit is changed over to a continuous signal upon actuation of the first interruptor means, and the continuous signal in the second warning unit is extinguished upon disappearance of the fault signal, and means including second interruptor means for producing a continuous signal in the second alarm unit in the absence of a fault signal upon and substantially co-extensive with the actuation of said second interruptor means.

14. A fluid alarm sequence, comprising:

an input unit for receiving a fault signal and transmitting the same to the sequence in binary code including a bi-stable switching device having an output adapted to produce the binary signal, a control input, and a supply input fed permanently with predetermined fluid pressure, a first alarm unit operable to produce a continuous signal in response to continuous actuation in the presence of a fault signal, first means operatively connecting the output of said input unit to said first alarm unit including a first bi-stable switching device having a control input, a supply input connected to the output of the input unit, and an output connected to the first alarm unit, a memory unit operatively connected with said input unit and said first bi-stable switching device including two bi-stable switching devices each provided with a supply input, a control input and an output, the supply input of one of the two bi-stable switching devices being fed permanently with predetermined fluid pressure, the output of said one switching device being connected to the control input of the other one of the two bi-stable switching devices, the output of said other bi-stable switching device being connected to the control inputs of said first bi-stable switching device and of said one bi-stable switching device, and the supply input of said other bi-stable switching device being connected to the output of said input unit, first interruptor means for temporarily interrupting the supply input of the one of said two bi-stable switching devices, a second alarm unit operable to produce a rhythmic signal in response to rhythmic operation in the presence of a fault signal and a continuous signal in response to continuous operation upon actuation of said first interruptor means in the presence of the fault signal, an oscillator unit operable to produce a rhythmic output signal in binary code including three bi-stable switching devices each having a supply input, a control input and an output, the output of the first one of the three bi-stable switching devices being connected to the control input of the next one of the three bi-stable switching devices whose output is connected to the control input of the last one of the three bi-stable switching devices while the output of the last one of the three bi-stable switching devices is connected to the control input of the first one of the three bi-stable switching devices and the supply input thereof is fed permanently with predetermined pressure fluid, second means operatively connecting the output of the input unit to the supply input of the first one of the three bi-stable switching devices of the oscillator unit including a second bi-stable switching device having a supply input connected to the output of the input unit, an output connected to the supply input of the first one of the three bi-stable oscillator switching devices, and a control input, third means operatively connecting the output of the last one of the three bi-stable switching devices of said oscillator unit to the second alarm unit including a logical "OR" circuit formed by three bi-stable switching devices each having a supply input, a control input and an output, the supply input of the first and last bi-stable switching devices of the "OR" circuit being permanently fed with predetermined fluid pressure, the output of the first switching device of the "OR" circuit being connected to the supply input of the second switching device thereof, the control input of the second switching device of the "OR" circuit being connected to the output of the last switching device of the oscillator unit while the output of the second switching device of the "OR" circuit is connected to the control input of the third switching device of the "OR" circuit whose output is connected to the second alarm unit, fourth means for supplying the input supply of the second switching device of the oscillator unit with predetermined fluid pressure, and fifth means operatively connecting the output of the other switching device of said memory unit to said fourth means for switching the condition of said oscillator, including a connection between the output of the other switching device of said memory unit with the control input of said second bi-stable switching device in said second means and the control input of the first switching device of the "OR" circuit, whereby a continuous alarm signal is produced in the first alarm unit and a rhythmic alarm signal is produced in the second alarm unit in the presence of a fault signal, the continuous signal in the first alarm unit is extinguished and the rhythmic signal in the second alarm unit is changed over to a continuous signal upon actuation of the first interruptor means, and the continuous signal in the second warning unit is extinguished upon disappearance of the fault signal, and means including second interruptor means for producing a continuous signal in the second alarm unit in the absence of a fault signal upon and substantially co-extensive with the actuation of said second interruptor means, said second interruptor means being in the supply input to the first switching device of the "OR" circuit.

15. A fluid-operated alarm sequence, comprising:

first and second fluid operated warning means for producing an indication, first control means responsive to a fault indicating signal for producing an actuating signal effecting continuous operation of said first warning means, second control means responsive to said fault indicating signal for producing a rhythmic signal effecting rhythmic operation of said second warning means, and third control means including manually actuatable means for producing a control signal overriding said fault indicating signal at said first control means to disable said first control means and said first warning means and simultaneously switch said second control means to provide for continuous operation of said second warning means.

16. The combination defined in claim 15 wherein said first and second warning means are each audible warning means.

17. The combination defined in claim 15 further including manually operable fourth means connected to said second control means for producing an additional signal switching said second control means for effecting operation of said second warning means in the absence of a fault indicating signal.

18. The combination defined in claim 15 wherein said second control means includes a plurality of interconnected fluid distributing devices forming a fluid oscillator.

19. The combination defined in claim 18 wherein said second control means further includes a plurality of interconnected fluid distributing devices forming a fluid operated OR circuit having first and second inputs, said fluid oscillator being connected to one of said inputs.

20. The combination defined in claim 19 wherein said third control means includes a pair of interconnected fluid distributing devices forming a memory circuit providing an output in response to said fault indicating signal and maintaining said output after release of said signal.

References Cited
UNITED STATES PATENTS

| | | | |
|---|---|---|---|
| 2,387,810 | 10/1945 | Smith | 137—557 |
| 2,754,788 | 7/1956 | Sperry | 116—65 |
| 2,754,793 | 7/1956 | Sperry | 116—65 |
| 2,940,070 | 6/1960 | Sanders | 340—271 |
| 2,952,502 | 9/1960 | Hildenbrandt | 346—33 |
| 3,038,439 | 6/1962 | Martin et al. | 116—117 |
| 3,059,596 | 10/1962 | Pretini | 109—38 |
| 3,129,722 | 4/1964 | Wagner | 137—557 |
| 3,173,127 | 3/1965 | Brunner | 137—557 |
| 3,199,523 | 8/1965 | McEathron | 137—557 |
| 3,223,068 | 12/1965 | Van Winkle | 116—65 |
| 3,254,670 | 6/1966 | Puster | 116—70 |

RICHARD B. WILKINSON, *Primary Examiner.*

LOUIS J. CAPOZI, *Examiner.*

L. R. FRANKLIN, *Assistant Examiner.*